July 20, 1965

R. T. THOMPSON 3,195,663

SCALES

Filed Dec. 11, 1962

INVENTOR.
ROBERT T. THOMPSON
BY
Wallace, Kinzer & Dorn
ATTYS.

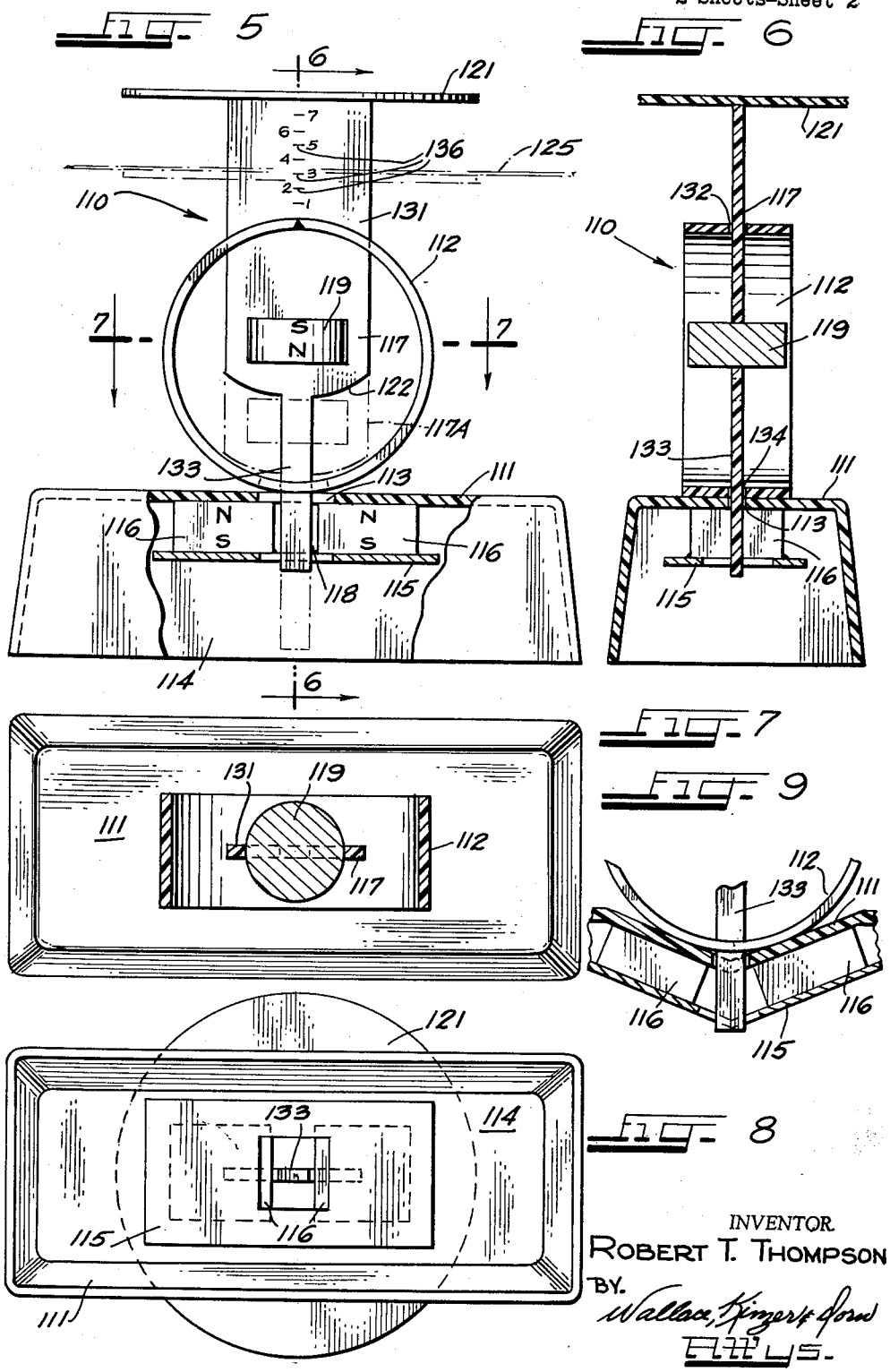

United States Patent Office 3,195,663
Patented July 20, 1965

3,195,663
SCALES
Robert T. Thompson, Palatine, Ill., assignor to General Magnetic Corporation, Detroit, Mich., a corporation of Illinois
Filed Dec. 11, 1962, Ser. No. 243,777
4 Claims. (Cl. 177—201)

This invention relates to a new and improved magnetic scale and more particularly to a simple and economical scale structure suitable for use as a postal scale.

There is a definite need for a simple and inexpensive scale capable of accurate operation over a relatively small range. In particular, in the weighing of items to be mailed, it is necessary to provide for accurate measurement in order to avoid wasting postage, while at the same time assuring the application of adequate postage. Most previously known postage scales have been spring-operated, with resulting inherent inaccuracies attendant upon aging of the springs or similar elements. On the other hand, magnetically actuated scales have been proposed for various purposes, but these devices have generally been relatively complex and expensive in construction and are not well adapted to use as postal scales.

It is a principal object of the present invention, therefore, to provide a new and improved postal scale that is magnetic in operation and of simplified construction, yet which is highly accurate.

A particular object of the invention is to provide a new and improved permanent magnet operating mechanism for a postal scale or other similar weighing device that does not vary substantially in its operating characteristics despite repeated use over long periods of time.

A specific object of the present invention is to afford an effective and accurate scale mechanism consisting primarily of two permanent magnets working in opposition to each other, the remaining elements of the mechanism being utilized principally to protect the permanent magnets and to guide relative movements of the magnets.

A specific object of the invention is to eliminate entirely any compression or spring effect in a magnetically operated weighing scale.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention and the purview of the appended claims.

In the drawings:

FIG. 5 is an elevation view, partially cut away, of another embodiment of the invention;

FIGS. 6 and 7 are sectional views taken approximately as indicated by lines 6—6 and 7—7, respectively, in FIG. 5;

FIG. 8 is a bottom view of the device of FIG. 5; and

FIG. 9 is a detail view illustrating a modification of FIG. 5.

Figure 1:
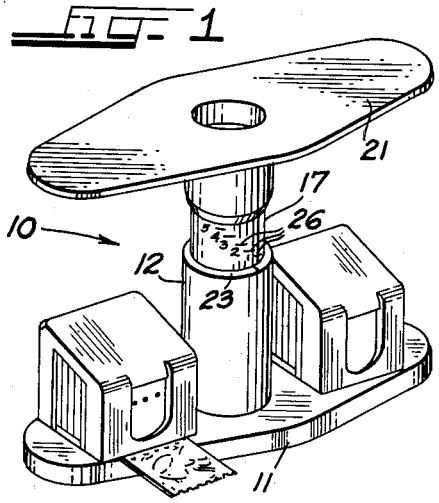
FIG. 1 is a perspective view of a magnetic weighing scale constructed in accordance with one embodiment of the present invention.
Figure 2:
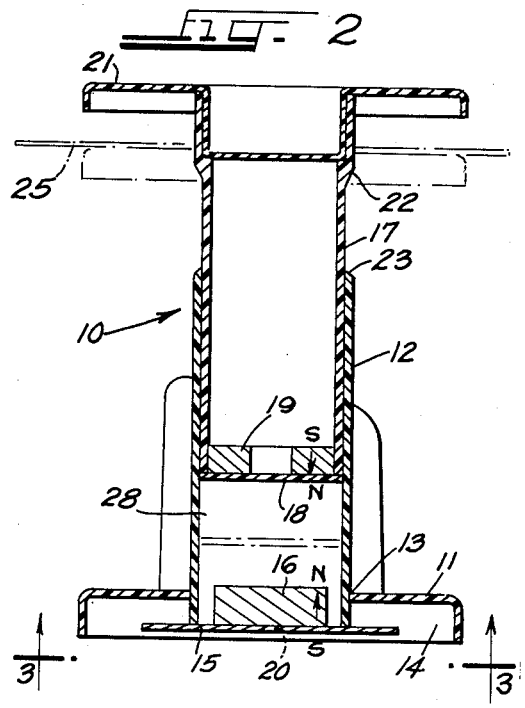
FIG. 2 is a transverse sectional view of the scale of FIG. 1.
Figure 3:
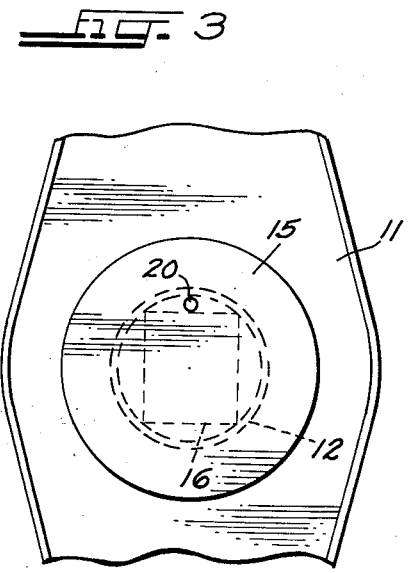
FIG. 3 is a partial bottom view of the scale, taken approximately as indicated by line 3—3 in FIG. 2.

FIGS. 1–3 illustrate a postal scale 10 constructed in accordance with one embodiment of the present invention. The magnetic weighing scale 10 comprises a base 11 that is preferably fabricated from a non-magnetic material. For example, base 11 may be of molded plastic or other lightweight, inexpensive material.

A first guide member 12 is mounted upon the central portion of base 11. As best shown in FIGS. 1 and 2, guide member 12 is of elongated cylindrical configuration, the axis of the guide member extending vertically upwardly from base 11. Guide member 12 could be mounted upon the top surface of base 11; in the illustrated construction, however, the guide member extends through a circular aperture 13 in the base and projects downwardly a short distance into a chamber 14 in base 11. Guide member 12 is also formed of a non-magnetic material and may constitute simply a relatively short length of pre-formed plastic tubing. Guide member 12 may be affixed to base 11 by any suitable means. For example, the guide member and the base may be secured to each other by an epoxy resin or other resin bond to afford an inexpensive yet strong construction. Alternatively, the guide member may be molded integrally with the base.

At the bottom of guide member 12, a magnetic shield member 15 is mounted on the guide member, closing the bottom of the cylinder. Shield 15 should be formed of a high-permeability material, although it is not necessary to utilize any specialized magnetic alloys for this member. Shield 15 may be secured to the bottom end of the cylindrical guide 12 by any suitable means, for example, an epoxy resin bond can be used to mount the shield on the base of the cylindrical guide. It should be noted that shield 15 does not extend below base 11. Rather, the shield is above the bottom of the base and thus is located within the base chamber 14.

A first permanent magnet 16 is mounted in the bottom portion of guide member 12 in axially centered alignment with the guide member. In the construction shown in FIGS. 2 and 3, magnet 16 is of rectangular configuration, the diagonal dimension of the magnet being approximately equal to the diameter of the cylindrical guide 12. The use of this particular shape for the permanent magnet is not essential, however. Thus, the magnet could be of disc-shaped configuration or of virtually any other desired configuration so long as it fits conveniently into guide cylinder 12 and can be approximately aligned with the axis of the cylinder.

Magnet 16 and shield 15 do not completely close off the bottom of guide cylinder 12. Instead, an air passage 20 is provided, extending through shield 15 and past magnet 16 into the interior of guide member 12 for a purpose explained more fully hereinafter.

Scale 10 further includes a second guide member 17; guide member 17, like guide member 12, is of elongated cylindrical configuration and is formed from a non-magnetic material. Guide member 17 fits into guide member 12 and is easily movable, in a vertical direction, through the lower guide member. Like guide member 12, guide member 17 may be fabricated from a relatively short length of plastic tubing.

The base of guide member 17 is closed by a plastic disc or plate 18. A second permanent magnet 19 is mounted within guide member 17 and is supported upon disc 18. The support disc 18 can be fabricated as a separate member and subsequently bonded to or otherwise mounted on guide member 17; on the other hand, these two members may be formed as a single integral molded plastic piece if desired. A mechanical mounting arrangement may be utilized to secure permanent magnet 19 at the bottom end of guide cylinder 17, but an inexpensive resin bond is usually best for this purpose.

The upper end of guide cylinder 17 carries a support platform 21. Platform 21 may be of any desired configuration, depending upon the shape of the objects to be weighed. This member of the scale could be of metal but preferably is of lightweight plastic construction. Any suitable means may be utilized to mount support platform 21 on guide cylinder 17 and, indeed, the two members may be formed as an integral plastic molding if desired. The upper portion of guide cylinder 17 further comprises a shoulder 22 positioned to engage the upper surface or rim 23 of the outer guide cylinder 12 to limit downward movement of the cylinder 17 into cylinder 12.

Base magnet 16, which preferably is substantially larger than the second magnet 19, is magnetized in a vertical direction. That is, the magnet is magnetized in a direction parallel to the axis of the guide cylinder 12 in which it is mounted. Magnet 19, on the other hand, is also magnetized in an axial direction but with opposite polarization relative to magnet 16. That is, if it is the north pole of magnet 16 that faces upwardly, then the north pole of magnet 19 must face downwardly. Because the fields of the two magnets are thus directly opposed to each other, the magnets are maintained in spaced relation, as best shown in FIG. 2, and the second guide member 17 is supported well above base 11 of the scale.

The normal unloaded position of guide member 17 and the elements carried thereby is shown in solid lines in FIG. 2. When a letter or other object 25 that is to be weighed is placed on platform 21, the additional weight on the platform forces guide member 17 downwardly into guide member 12. The relative displacement between guide members 12 and 17 is dependent upon and is a measure of the weight of the object 25 being weighed. Thus, it is a relatively simple matter to calibrate scale 10 to afford an accurate indication of the weight of objects disposed upon platform 21. In scale 10, guide member 17 is provided with a series of scale markings 26 to afford a direct reading of the weight of any object placed upon platform 21, the weight reading being taken at the rim 23 of guide member 12.

Displacement of guide member 10 is not linearly proportional to the weight of the object 25 placed upon the scale. On the other hand, calibration of the scale is not particularly difficult, especially where clearly defined increments of weight are to be measured and where there is no necessity for interpolation between weight increments, as is the case with a postage scale. To facilitate reading of the scale, markings 26 may be staggered peripherally of the guide cylinder 17 in the manner shown in FIG 1.

To assure consistent operation of the scale, it is desirable to avoid trapping air within the scale, particularly in the space 28 between the lower plate 18 on the upper guide cylinder 17 and the shield 15 that closes the bottom of guide cylinder 12. If there is no escape passage for air from space 28, the scale operation is changed substantially, since downward movement of guide member 17 would compress the air in space 28. The compression resistance, under such circumstances, would vary substantially with changes in temperature or other environmental factors. It is for this reason that air passage 29 is provided in shield 15, opening the otherwise enclosed space 28 to the atmosphere and limiting the resistance to downward movement of guide member 17 to that afforded by the opposed magnetic fields of permanent magnets 16 and 19.

In the embodiment of FIGS. 1–3, guide members 12 and 17 are of cylindrical configuration, but this configuration is not essential to the present invention. Thus, other shapes may be adopted for the guide members, provided they afford a minimum of frictional drag on the upper guide member. On the other hand, the cylindrical shape illustrated is preferred because, generally speaking, it is substantially less expensive to manufacture than most other configurations that would afford adequate guidance of the vertical movements of the scale.

The total effective magnetic force available from the permanent magnets is, of course, dependent to some extent upon the size of the magnets. At the same time, it is desirable to keep the weight of the upper or second permanent magnet 19 at a minimum, since this element is the principal mass in the movable portion of the scale and any addition to its weight reduces the effective range of the scale. A usable range can best be realized by employing a substantially larger magnet as the element 16 and by utilizing a relatively small magnet as the element 19. The weight of the sliding member of the scale can also be reduced to some extent, without loss of accuracy or any substantial reduction in range, by employing a cylindrical magnet as the member 19, and this configuration is shown in FIG. 2.

If magnets 16 and 19 come into contact or closely approach contact with each other, there is a substantial tendency toward demagnetization of the two magnets. To prevent this, and to establish a clearly defined maximum weight limit for the scale, shoulder 22 is provided on guide member 17. Thus, as the weight on platform 21 is increased and guide member 17 is driven downwardly, shoulder 22 engages the rim 23 of guide member 12 and affords a positive stop that limits the downward movement of the second guide member.

Shield 15 serves a dual purpose in postage scale 10. In the first place, it adds substantially to the weight concentrated in base 11, and, accordingly, adds to the stability of the scale. At the same time, member 15 functions as a pole piece or flux guide for the magnetic field of permanent magnet 16. The latter function of shield 15 is of principal importance when scale 10 is supported upon a steel desk top, since the large mass of steel in the desk top would otherwise tend to diffuse the field of magnet 16 and could affect calibration of the scale.

Figure 4:
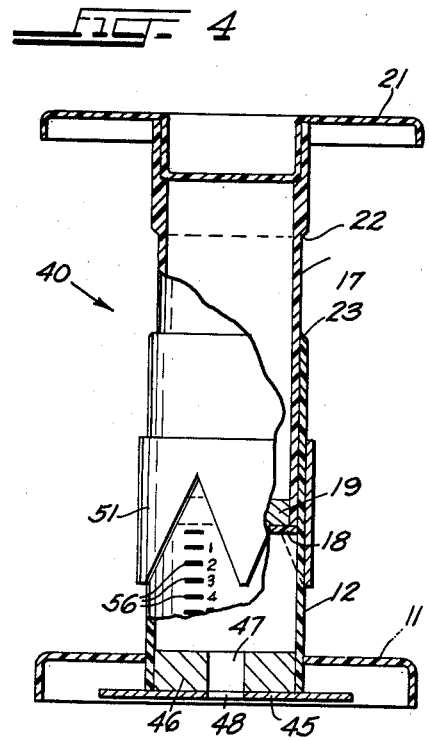
FIG. 4 is a transverse sectional view, similar to FIG. 2, of another embodiment of the present invention.

FIG. 4 illustrates a postal scale 40 that is generally similar, in most respects, to scale 10, but is modified in certain structural features to afford a slightly larger weighing range. Like scale 10, scale 40 includes a non-magnetic base 11 upon which a vertical cylindrical guide member 12 is mounted. As before, a first permanent magnet 46 is mounted at the bottom of guide member 12. Furthermore, a magnetic shield 45 is affixed to the bottom of guide member 12 and extends across the face of magnet 46. In this instance, magnet 46 is of cylindrical configuration and is provided with a central aperture 47 aligned with a similar aperture 48 in shield 45, thereby providing a continuous air passageway into the interior of guide member 12.

Scale 40 further includes a second or upper guide member 17 that is of the same construction as the corresponding member in scale 10. Thus, guide member 17 carries a support 21 for the letters or other objects to be weighed. At the lower end of the guide member a second permanent magnet 19 is mounted, the bottom of the guide member being closed by a disc 18 that supports the magnet. Again, guide member 17 is provided with a stop member or shoulder 22 positioned to engage the upper rim 23 of guide member 12 and thereby prevent magnets 19 and 46 from approaching each other so closely as to accelerate demagnetization.

Scale 40, however, is provided with an additional magnetic member that is not present in scale 10. The additional element in the magnetic system is a cylindrical magnetic shunt 51 that is mounted upon guide member 12 at a predetermined displacement from base 11. Magnetic shunt 51 is not directly engaged with either of the two permanent magnets in the system. However, it is closely magnetically coupled to permanent magnet 19, being separated from this magnet only by the walls of guide members 17 and 12, which are relatively thin in construction.

Shunt member 51 serves as a flux guide or pole piece, concentrating the magnetic field from permanent magnet 19. In effect, therefore, shunt member 51 enhances and strengthens the magnetic field of the smaller of the two permanent magnets, with the result that magnet 19 is supported at a greater distance from magnet 46 than would be the case if the shunt were absent. As shown in FIG. 4, the lower edge of shunt member 51 is preferably of toothed or scalloped construction, making it possible to see the lower edge of permanent magnet 19 and the edge of disc 18 even with the scale in its unloaded position with guide member 17 at its maximum elevation. In scale 40, guide member 12 is of transparent or translucent material with a series of scale markings 56 provided on this guide member instead of on guide member 17. Thus, reading of the scale is accomplished by noting the position of the edge of disc 18, through the transparent guide member 12, relative to scale markings 56.

FIGS. 5–8 illustrate a postal scale 110 constructed in accordance with a further embodiment of the present invention. Scale 110 comprises a plastic base 111 upon which a first guide member 112 is mounted. Guide member 112 is of cylindrical configuration, but the axis of the guide member is horizontal, as contrasted with the vertically oriented cylindrical guide members used in the previous embodiments. Guide member 112 may be mounted on base 111 by any suitable means, or could be molded integrally with the base.

Immediately below guide member 112, a magnetic shield member 115 is mounted within the cavity 114 defined by base 111. Shield 115 is formed of a relatively high permeability magnetic material and has a pair of permanent magnets 116 mounted thereon. As before, shield 115 does not extend below base 111, but is located entirely within the base chamber 114. Separate hangers or support members could be provided for the shield 115; in the illustrated construction, however, the shield member is simply bonded to magnets 116 which, in turn, are bonded to the under surface of the top portion of base 111.

Magnets 116 may be of any desired configuration permitting polarization in a substantially vertical direction. Furthermore, it is not essential that two separate magnets be utilized. A single annular magnet such as the magnet 46 (FIG. 4) could be employed. In this embodiment, however, it is necessary that there be provided a central aperture 118 between the magnets or at the central portion of the magnet structure, the aperture 118 being aligned with an aperture 113 in the top plate of base 111.

Scale 110 further comprises a second guide member 117 that extends through and is vertically movable with respect to guide member 112. The upper portion 131 of guide member 117 is relatively broad in one dimension, as shown in FIGS. 5 and 7, and fits into an elongated slot 132 in the upper portion of guide member 112. The lower end 133 of guide member 117 is substantially narrower than the upper portion 131, the connecting surface affording a shoulder 122. The relatively narrow lower end 133 of guide member 117 extends downwardly through a small guide aperture 134 in the lower portion of guide member 112 as shown in FIGS. 5 and 6. Furthermore, the lower end 133 of the second guide member projects downwardly into base 111, extending through apertures 113 and 118 in the base and magnetic structures, respectively.

A second permanent magnet 119 is mounted upon guide member 117 a short distance above the shoulder 122 on the guide member. Permanent magnet 119 is vertically polarized in an opposite sense from the magnets 116 in the base of the scale. Thus, the opposed magnetic fields of magnets 119 and 116 support magnet 119 and guide member 117 at a predetermined distance from base 111, depending upon the weight of the magnet and guide structure and the strength of the magnets.

The upper end of guide member 117, as before, carries a weighing platform 121. Suitable scale markings 126 may be provided on the upper portion 131 of guide member 117 intermediate platform 121 and the upper part of stationary guide member 112. Alternatively, scale markings could be placed on the lower portion 133 of guide member 117 or, if desired, the scale markings could be applied to stationary guide member 112 or to a separate scale member affixed thereto.

The normal unloaded position of guide member 117 and the elements carried by this guide member is illustrated in solid lines in FIG. 5. When a letter or other object 125 to be weighed is deposited upon platform 121, the additional weight forces guide member 117 downwardly against the resistance afforded by the opposed magnetic fields of magnets 116 and 119. The displacement of guide member 117 is proportional to the weight of the object 125 supported upon platform 121. As before, this is not a completely linear relationship, but it is a relatively simple matter to calibrate the scale to provide a direct and accurate weight reading at the scale markings such as markings 126.

As in the previous embodiment, it is desirable to limit downward movement of guide member 117 to maintain a minimum spacing between magnets 116 and 119 at all times. In the embodiment of FIGS. 5–8, this is accomplished by engagement of shoulder 122 of guide member 117 with the inner lower surface of guide member 112. In FIG. 5, the phantom outline 117A shows the maximum displacement of the scale with the shoulder of the movable guide member engaged with the fixed guide member.

It is not essential that magnets 116 be arranged in a horizontal alignment, as shown in FIGS. 5 and 8. Instead, base 111 and shield 115 may be constructed to be of substantially V-shaped configuration, so that the base magnets face somewhat inwardly as well as upwardly. This minor modification of the construction may be desirable in order to increase the effective strength of the base magnets in opposition to the magnetic field of movable magnet 119, but may add very slightly to the cost of the overall scale structure. This modification of the scale 110, which is also of assistance in affording a somewhat more linear weight-displacement curve, is illustrated in FIG. 9.

In all of the foregoing examples of the present invention, the permanent magnets are mounted entirely within other elements, and particularly within the guide members of the scales. This arrangement is preferred because ceramic magnets, in particular, are rather easily fractured. Thus, the illustrated arrangement protects the magnets from damage that might be incurred if they were exposed. On the other hand, if rugged and durable magnets are available, the magnets may be mounted in external encompassing relation to the guide members, an arrangement that can be readily attained, in the embodiments of FIGS. 1–4, by utilizing ring-shaped magnets and by reversing the relationship of guide members 12 and 17 so that the upper guide member is disposed externally of the lower guide member.

The present invention is completely magnetic in its operation and does not depend upon a spring or any other similar member having any substantial tendency to change its operating characteristics with age. The described constructions avoid any sealed chambers or other compression devices that could change in their characteristics as a result of deterioration of sealing members or as the result of changes in environmental factors such as the ambient temperature. It will be recognized that the invention is applicable to force measuring devices other than weighing scales, although the most advantageous application of the invention is in weighing devices. As pointed out above, the scale structure is extremely simple and inexpensive to manufacture.

Hence, while preferred embodiments of the invention have been described and illustrated, it is to be understood that they are capable of variation and modification, and I therefore do not wish to be limited to the precise details set forth, but desire to avail myself of such changes and alterations as wall within the purview of the following claims.

I claim:

1. A magnetic weighing scale comprising:
   a base;
   a first elongated cylindrical guide member of non-magentic material mounted on said base and projecting vertically therefrom;
   a first permanent magnet mounted in axial alignment with said first guide member, said first permanent magnet being magnetized axially of said first guide member;
   a second elongated cylindrical guide member of non-magnetic material engaged in interfitted axially aligned relation with said first guide member for vertical sliding movement relative thereto, said second guide member including a support for an object to be weighed;
   a second permanent magnet, mounted on said second guide member in axial alignment therewith, and magnetized in a direction parallel to the axis thereof, said permanent magnets being oppositely polarized so that said second guide member is normally maintained at a predetermined spacing relative to said base;
   a cylindrical magnetic shunt member, mounted on said first guide member in predetermined axial spacing relative to said base and separated from said second permanent magnet by at least one of said guide members, for concentrating the external field of said second permanent magnet and extending the range of said scale;
   and scale marks on one of said guide members indicative of relative displacement therebetween effected by the disposition of an object to be weighed on said support.

2. A magnetic measuring device comprising:
   a base;
   a first guide member mounted on said base and projecting therefrom, defining an elongated guide path;
   a first permanent magnet mounted on said first guide member, said first permanent magnet being magnetized in a direction substantially parallel to said guide path;
   a second elongated guide member engaged in interfitted aligned relation with said first guide member for sliding movement along said path;
   a second permanent magnet, mounted on said second guide member and magnetized in a direction substantially parallel to said path, said permanent magnets being oppositely polarized so that said second guide member is normally maintained at a predetermined spacing relative to said base by their opposed magnetic fields;
   a high-permeability metal shield mounted on said first guide member in contact with said first permanent magnet but within the confines of said base;
   and scale marks on one of said guide members indicative of relative displacement therebetween effected by a force moving said second guide member toward said base.

3. A magnetic weighing scale comprising:
   a base;
   a first elongated vertical guide member mounted on said base;
   a first permanent magnet mounted on said base in predetermined alignment with said first guide member, said first permanent magnet being magnetized in a direction substantially parallel to said first guide member;
   a high-permeability metal shield mounted on said base below said first permanent magnet, said shield having a substantially larger horizontal surface area than said first permanent magnet and serving to prevent substantial diffusion of the magnetic field of said first magnet when the scale is supported on a metal surface;
   a second elongated guide member engaged in interfitted sliding relation with said first guide member for vertical movement relative thereto, said second guide member including a support for an object to be weighed;
   a second permanent magnet, mounted on said second guide member in alignment with said first permanent magnet, and magnetized in a direction substantially parallel to said first guide member, said permanent magnets being oppositely polarized so that said second guide member is normally maintained at a predetermined spacing relative to said base;
   and scale markings on one of said guide members indicative of relative displacement therebetween effected by the disposition of an object to be weighed on said support.

4. A magnetic weighing scale comprising:
   a non-magnetic base;
   a first elongated cylindrical non-magnetic guide member mounted on said base and projecting vertically upwardly therefrom;
   a first permanent magnet mounted in axial alignment within the bottom of said first guide member, said first permanent magnet being magnetized axially of said first guide member;
   a second elongated cylindrical non-magnetic guide member disposed within said first guide member for vertical sliding movement therein, said second guide member including a support platform for an object to be weighed;
   a second permanent magnet, mounted in the bottom of said second guide member in axial alignment therewith, and magnetized in a direction parallel to the axis thereof, said permanent magnets being oppositely polarized so that said second guide member is normally maintained at a predetermined spacing relative to said base;
   a shoulder member projecting from said second guide member in position to engage the top of said first guide member to prevent engagement of said magnets, and consequent demagnetization thereof, by limiting downward movement of said second guide member;
   a high-permeability metal shield mounted on said base below said first permanent magnet, said shield having a substantially larger horizontal surface area than said first permanent magnet and serving to prevent substantial diffusion of the magnetic field of said first magnet when the scale is supported on a metal surface;
   a cylindrical magnetic shunt member, mounted on said first guide member in predetermined axial spacing relative to said base and separated from said second permanent magnet by at least one of said guide members, for concentrating the external field of said second permanent magnet and extending the range of said scale;

and scale markings on one of said guide members indicative of relative displacement therebetween effected by the disposition of an object to be weighed on said support.

References Cited by the Examiner

UNITED STATES PATENTS

| | | | |
|---|---|---|---|
| 478,699 | 7/92 | Kovsky | 177—231 |
| 1,281,389 | 10/18 | Kaupert | 177—232 |
| 2,148,523 | 2/39 | Baermann | 177—201 |
| 2,559,919 | 7/51 | Gustafsson | 177—210 |
| 3,123,165 | 3/64 | Carson et al. | 177—208 |

FOREIGN PATENTS

| | | |
|---|---|---|
| 905,461 | 4/45 | France. |
| 634,741 | 9/36 | Germany. |
| 692,593 | 6/40 | Germany. |

LEO SMILOW, *Primary Examiner.*